Patented Mar. 20, 1923.

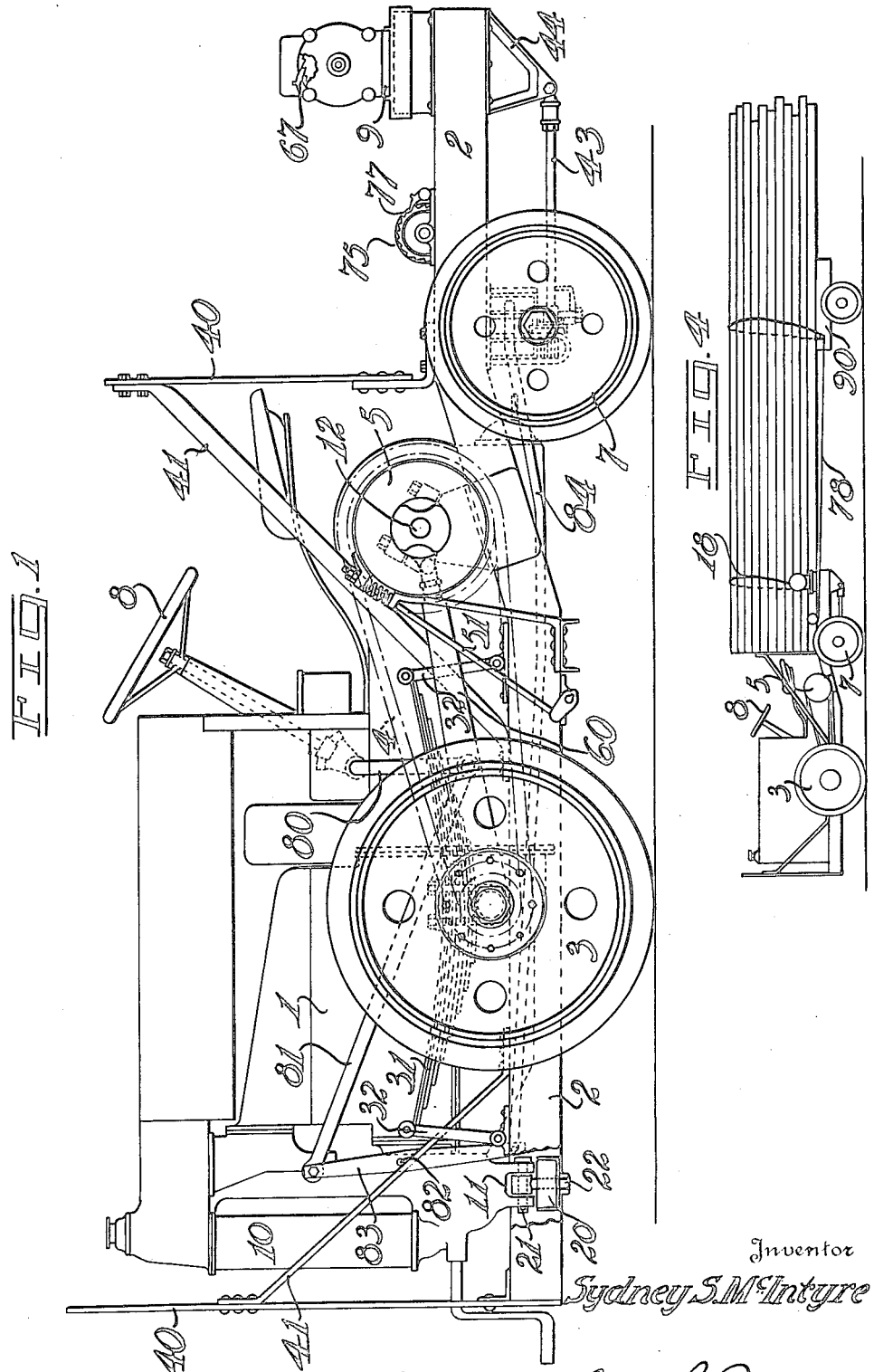

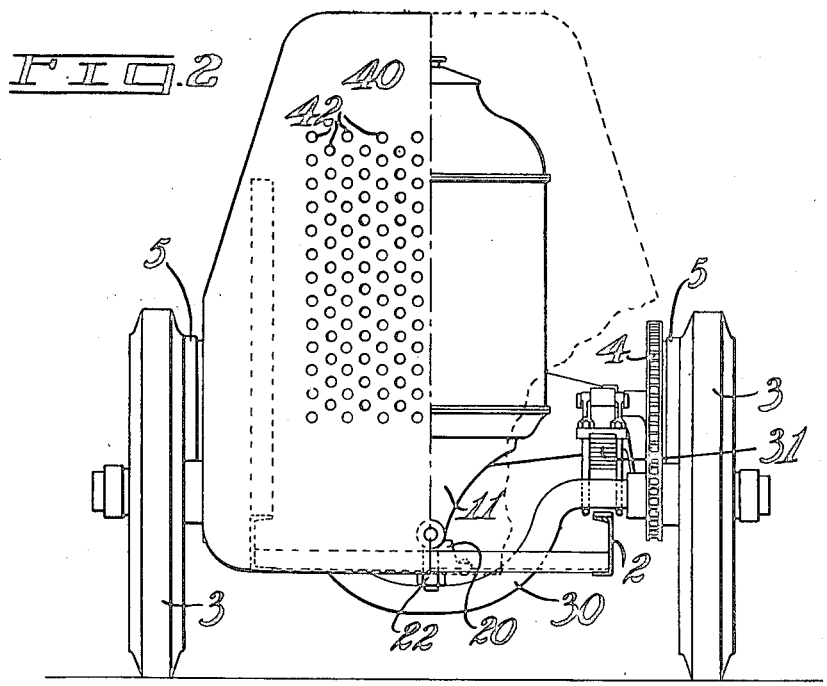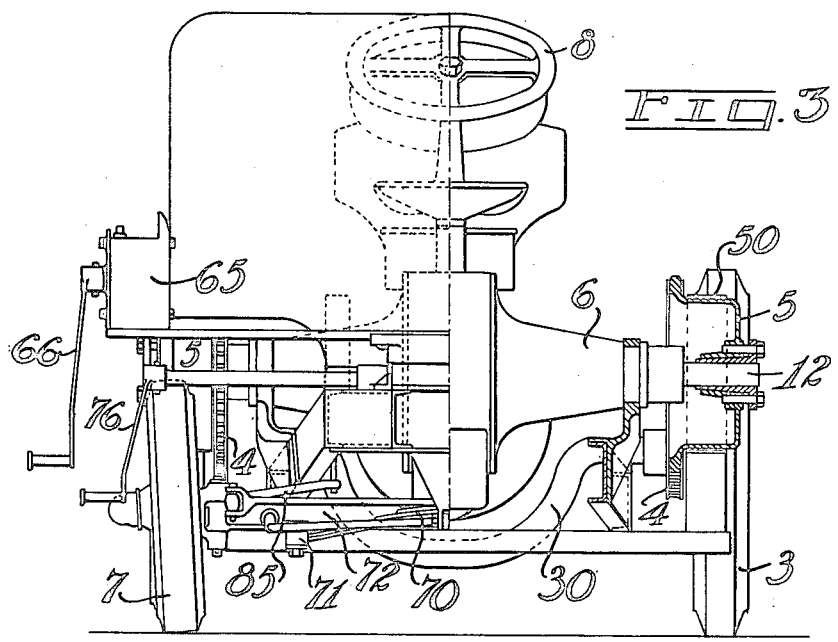

1,449,186

UNITED STATES PATENT OFFICE.

SYDNEY S. McINTYRE, OF SEDRO-WOOLLEY, WASHINGTON.

TRACTOR.

Application filed October 27, 1921. Serial No. 510,714.

*To all whom it may concern:*

Be it known that I, SYDNEY S. MCINTYRE, a citizen of the United States of America, and resident of the city of Sedro-Woolley, Skagit County, State of Washington, have invented certain new and useful Improvements in Tractors, of which the following is a specification.

My invention relates to tractors and particularly to a tractor which is designed for handling lumber, as about the yards of a saw mill or lumber yard.

It has been the object of my invention to employ the essential parts of an ordinary commercial or agricultural tractor by shifting the positions of parts thereof and adding special parts thereto so as to form a tractor which is especially adapted for this kind of work.

The special features of the device illustrated in the accompanying drawings and hereinafter described which I believe to be new and upon which I desire to obtain a patent, will be hereinafter specifically set forth in the claims terminating this specification.

In the accompanying drawings I have shown a tractor constructed in accordance with my invention in which the principal parts of a well-known commercial tractor have been employed as the basis.

Figure 1 is a side view of the complete tractor constructed in accordance with my invention.

Figure 2 is a view taken from the front, showing one side in front elevation and the other side in a section taken to the rear of the front end of the tractor frame.

Figure 3 is an elevation from the rear, one side being in section taken at the plane of the driving axle.

Figure 4 is a side elevation showing in a diagrammatic manner, the manner of using this tractor for hauling lumber and like materials.

The basis for the construction of this tractor is a well-known commercial tractor. This tractor has the engines enclosed within a casing 1, a radiator 10 and a frame connecting these parts together in the form of a casing which includes within it the usual transmission and reverse mechanisms, which mechanisms are, however, not attempted to be illustrated in detail in the accompanying drawings. In such commercial tractor the front axle is secured to the engine casing or frame at the point 11 and the rear or driving axle at 12. In the particular tractor illustrated the casing within which the engine is placed and which encloses the transmission mechanism, forms the essential parts of the frame of the tractor.

In adapting such a tractor to produce the particular type of tractor which is the subject of my invention, the rear driving wheels are removed from the driving axle 12. Also the front axle, together with its wheels, and the steering mechanisms carried by said axle, are removed bodily. A special chassis frame 2 is provided. This has two side beams connected by cross bars at suitable points. One cross bar, as 20, is placed near the forward end and is provided with suitable pivot bolts by which the same may be connected with the frame in the same manner as was the front axle of the original tractor. This form of connection with the special make of tractor therein illustrated employs two pivot bolts, a vertical bolt 22 and a horizontal bolt 21, thus making a universal pivot connection of the front end of the power plant with the special chassis or frame.

Special traction wheels 3 are provided. These are journaled upon or connected to the chassis 2 at a point which is between the point of connection of the front axle of the original tractor and the driving axle 12. In the construction illustrated this has been done by employing an axle 30 which is bent downwardly in its central portion so as to pass completely under the operating parts of the tractor. The wheels 3 are journaled upon the ends of this axle.

The connection of the axle to the chassis is through the intervention of a spring 31 at each side of the tractor which spring is centrally clamped to the axle adjacent to the driving wheel and is connected to the chassis by shackle links 32. Power transmission or driving connection is provided between the ordinary driving axle 12 of the original tractor and the traction wheels 3. As herein illustrated this is by a sprocket chain drive, the same consisting of the sprocket chain 4 and the sprocket wheels which are secured respectively to the tractor wheels 3 and to the end sections of the axles 12.

The axle 12 is supposed to be of the usual type of construction for the driving axle of automotive vehicles, being made in two parts connected by a differential. It is not thought necessary to describe this in detail as its construction is, or may be, of any standard type of construction employed for such axles.

Upon the outer ends of the driving axles 12 at the point where the traction wheels of the original tractor were secured, are secured brake drums 5. Around these are placed brake bands 50 which are operated through a rod 51 and a foot lever or any other suitable mechanism desired. The axle housing 6 of said driving axle is connected with the axle of the traction wheels 3 by means of thrust rods 60.

The front axle with its wheels and the steering mechanism of the original tractor are secured to the frame or chassis 2 towards the rear end thereof. These wheels 7, together with the axle and steering mechanisms, are all of standard construction. The chassis is supported from this axle by means of two springs, as 70, placed one at each side of the axle and centrally secured to the chassis. The ends of the springs enter pockets or recesses, as 71, which are carried by the sides of the axle 72.

The wheel 8 of the steering mechanism is the steering wheel of the original tractor. This part of the steering mechanism is in no way altered. Such steering mechanism employs an arm 80 which is pivoted at its upper end and swings from front to rear as the means for transmitting the action of the wheel to the steering mechanism. To the swinging end of the arm 80 is secured a rod 81 which extends forwardly. This rod is pivoted to the upper end of a lever 83 which is pivoted at 82 and has its lower end connected with a rod 84 which extends rearwardly and is connected with the steering arm 85 of one of the stub axles.

The rear end of the main chassis 2 is raised to a sufficient level to approximately reach the top edge of the steering wheel 7. Upon the extreme rear end of the chassis 2 is secured a bunk 9 upon which the load of lumber is supported. In the contemplated use the lumber is loaded upon a lumber buggy or dolly, as 90, so that one end thereof is considerably heavier than the other. This end is supported until the rear end of the tractor is backed underneath it. It is then lowered upon the bunk 9 and is secured thereto.

To secure the lumber to the bunk 9 I have provided a small drum, as 65, which is operated through a crank as 66. A ratchet and pawl, as 67, serves to hold the drum in position when it is wound up. To this is secured a chain or cable 68, which is passed about the load of lumber and secured in any suitable way to the opposite end of the bunk. Such a chain is shown at 68 in Figure 4.

To further secure the lumber buggy or dolly to the tractor, I have provided a small drum at 75. This is also provided with a crank as 76 and with a ratchet wheel and pawl as 77. From this is extended a small cable as 78 which goes to eyes or guide hooks carried by the dolly and from one of these hooks at one side of the dolly over the lumber and is secured to a like hook at the opposite side of the dolly. In this way the rear end of the load is securely bound to the dolly or lumber buggy and also the lumber buggy is directly tied to the tractor. By the use of these drums these binding chains or cables may be drawn as tight as desired.

At the front and rear end of the operating mechanisms of the tractor are vertically placed two heavy plates 40 of a size to cover the mechanism of the tractor. These are designed as bumpers to prevent injury of the tractor by contact with any object. Suitable braces as 41 are provided running from these plates to the frame. The plate 40 which is at the front end of the tractor is provided with a large number of holes, as 42, through which air may be freely passed to act upon the radiator 10 of the power plant.

Brace rods 43, being the rods which are used in the original tractor to brace the ends of the steering axle, are applied for a similar purpose. They are connected at their ends distant from the axle to a bracket, as 44, which is secured to the rear end of the chassis 2.

In the design of tractor above illustrated and heretofore described, substantially all of the essential parts of the original tractor have been employed, but these have been assembled in different relationship to each other and in connection with a special chassis and certain other parts carried thereon. The special type of tractor which is the subject of my invention is required only in a limited number and consequently to manufacture such a tractor where all of the parts must be produced in a small scale in shops not equipped for the highest economy of manufacture, and especially to utilize the methods employed in shops of large production, would make such a tractor cost too much. By adopting as the basis for the tractor a commercial tractor which is produced on a large scale and at a cheap cost and rearranging parts thereof with the addition of such few special parts as may be needed to adapt the whole to the special use intended, makes it possible to construct a tractor very much cheaper than if all parts were manufactured by the firm making the special tractor.

The special tractor herein illustrated and described is well adapted for the special uses intended. By transferring the traction wheels from the extreme rear position, as in an original tractor to a point well forward thereof, and between the location of the front and rear axles of the original tractor, places this drive or traction wheel nearer to the center of gravity of the tractor and thus increases its tractive power. This is desirable for the reason that in the use contemplated special traction devices such as ribs or wings which will enter the ground cannot be employed. The steering axle is then transferred to a position which is rearwardly of that occupied by the driving axle 12 of the original tractor. In the manner above described an efficient tractor is produced at relatively small cost.

What I claim as my invention is:

1. A tractor comprising a chassis frame having an automobile type of power plant mounted theron, said power plant including a divided driving shaft and a differential connecting its parts, a main axle centrally bent to extend under the engine casing and with its ends over the side bars of the chassis, a leaf spring centrally secured above and to the axle at each side, supporting shackles connecting the spring ends with the side bars of the chassis, thrust rods for the axle ends, and sprocket wheel and chain drive connecting each traction wheel with its respective section of the drive shaft.

2. A tractor comprising an automobile type of power plant including a divided drive shaft and a differential connecting the ends of said shaft, a chassis frame having means for supporting the said driving shaft and a support for the forward end of the power plant located on the longitudinal center line, an axle extending under the engine, and having supporting connection with the chassis, traction wheels on said axle driving connection between each traction wheel and the driving shaft of the same side, steering wheels located rearwardly of the driving shaft, the chassis extending rearwardly of the steering wheels and being adapted to receive thereon a portion of the load.

3. A tractor comprising a power plant having a driving axle and transmission of a standard type, a chassis upon which said said power plant is mounted with the driving axle toward the rear, traction wheels mounted alongside of the engine, means for driving each wheel from its respective end of the driving shaft, and steering wheels located rearwardly of the driving shaft, the chassis extending rearwardly of the steering wheels to provide a platform upon which to support an end of a tractor load.

4. A tractor comprising an automobile power plant of standard type from which the automobile driving wheels have been removed, a frame upon which said power plant is mounted, said frame extending rearwardly of the driving shaft of said power plant to furnish a load receiving platform, and also having a transverse bulkhead extending upward rearwardly of the driving shaft, tractor wheels mounted at the sides of the power plant in position to carry most of the weight thereof, driving means connecting each of said tractor wheels with its respective end of the driving shaft, and steering wheels located on the frame rearwardly from the driving shaft.

Signed at Sedro-Woolley, Skagit County, Washington this 21st day of October 1921.

SYDNEY S. McINTYRE.